UNITED STATES PATENT OFFICE.

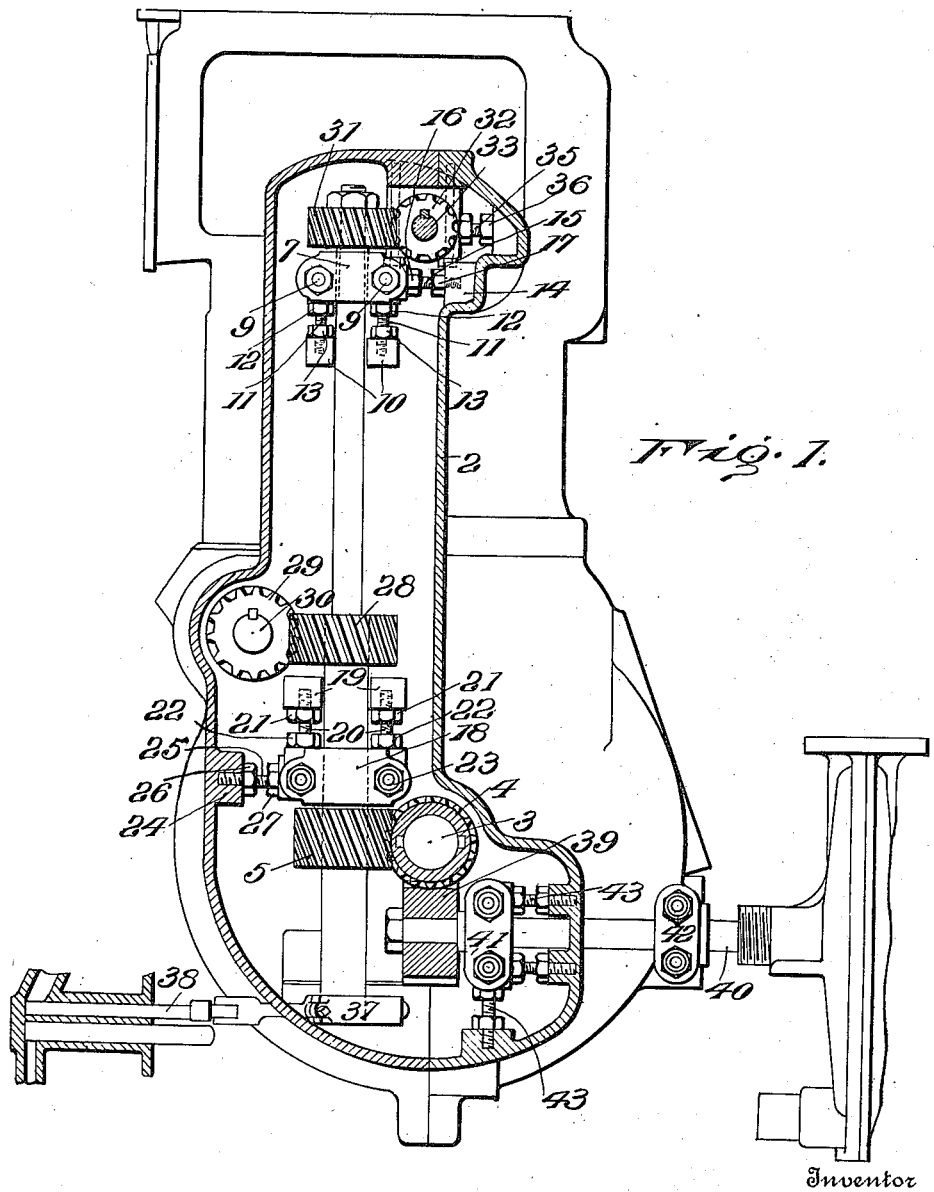

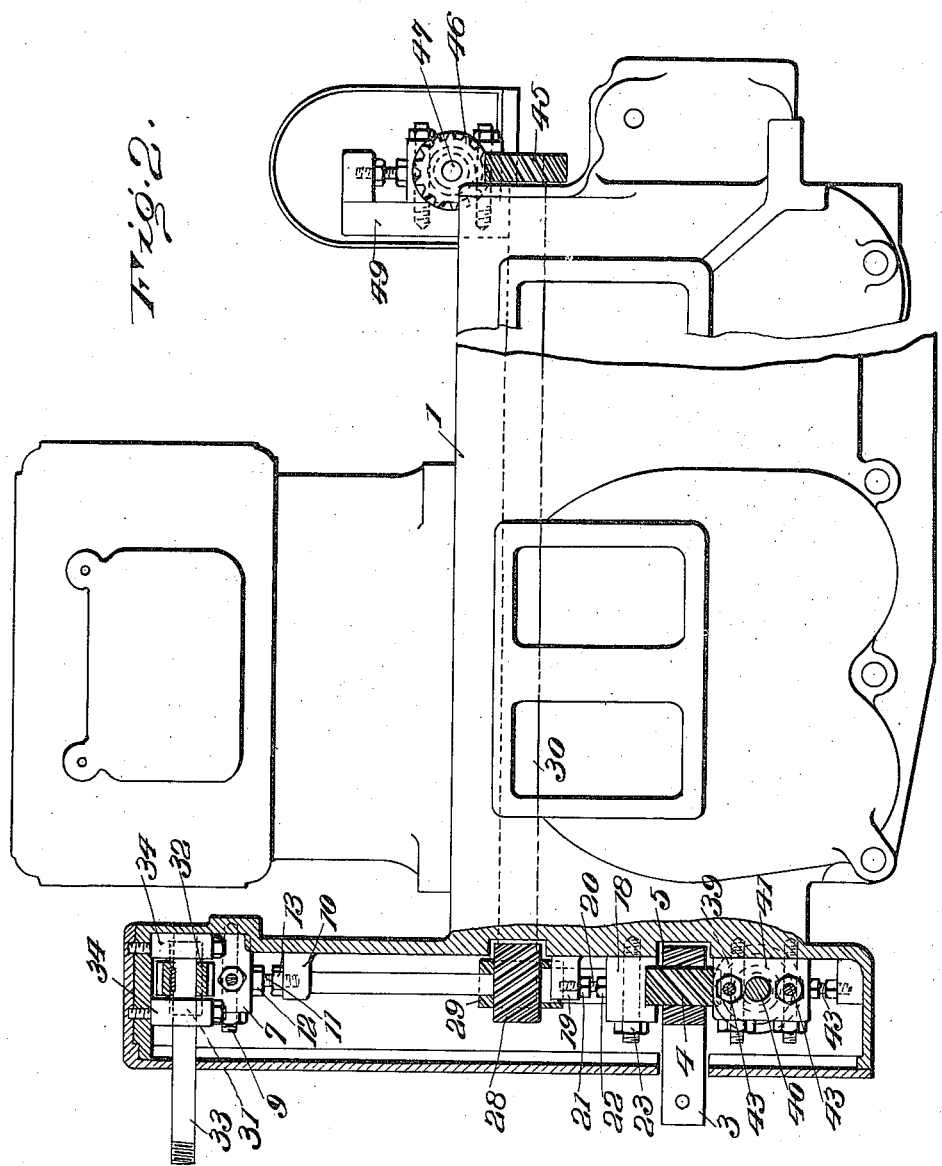

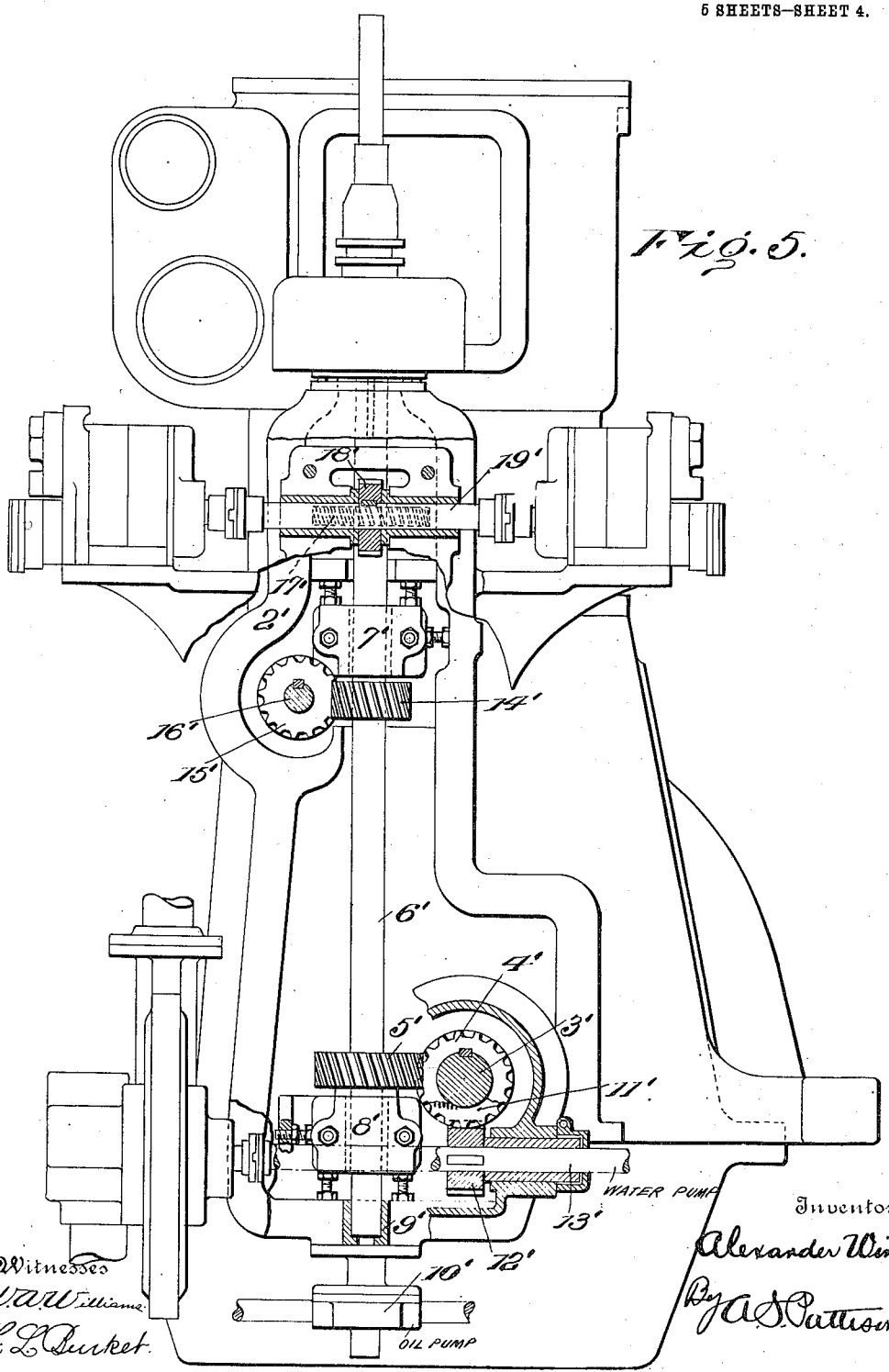

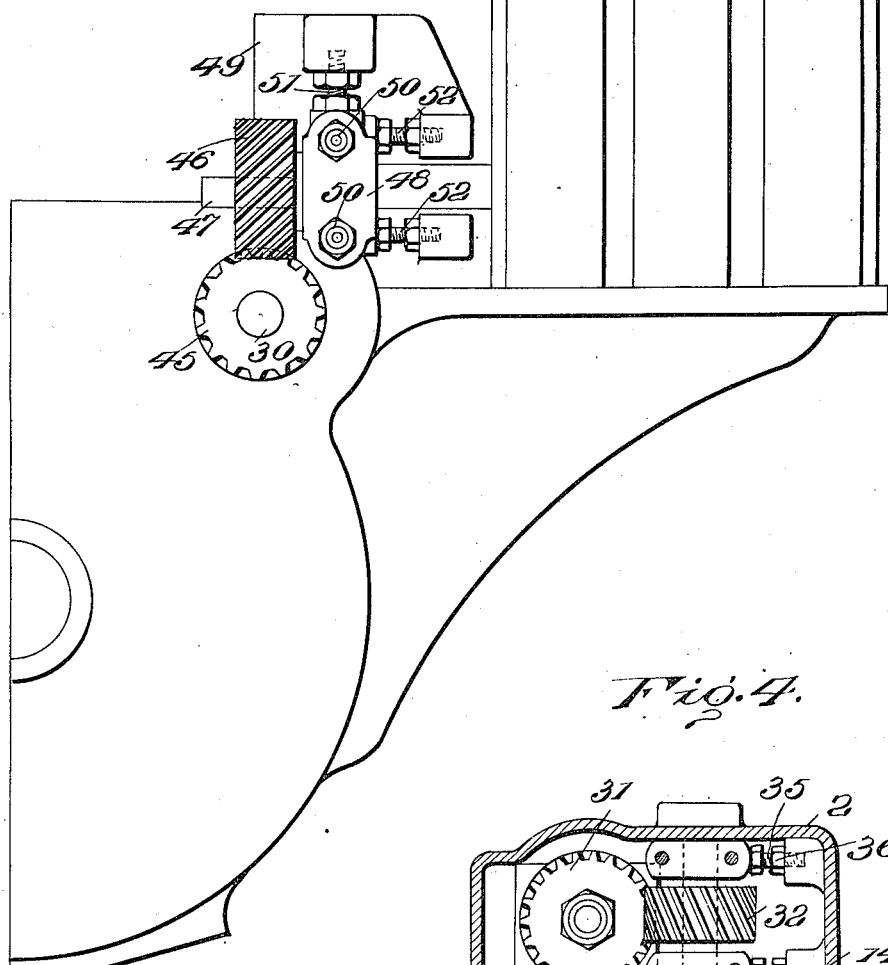
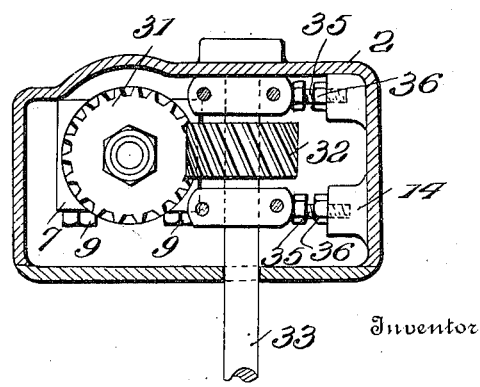

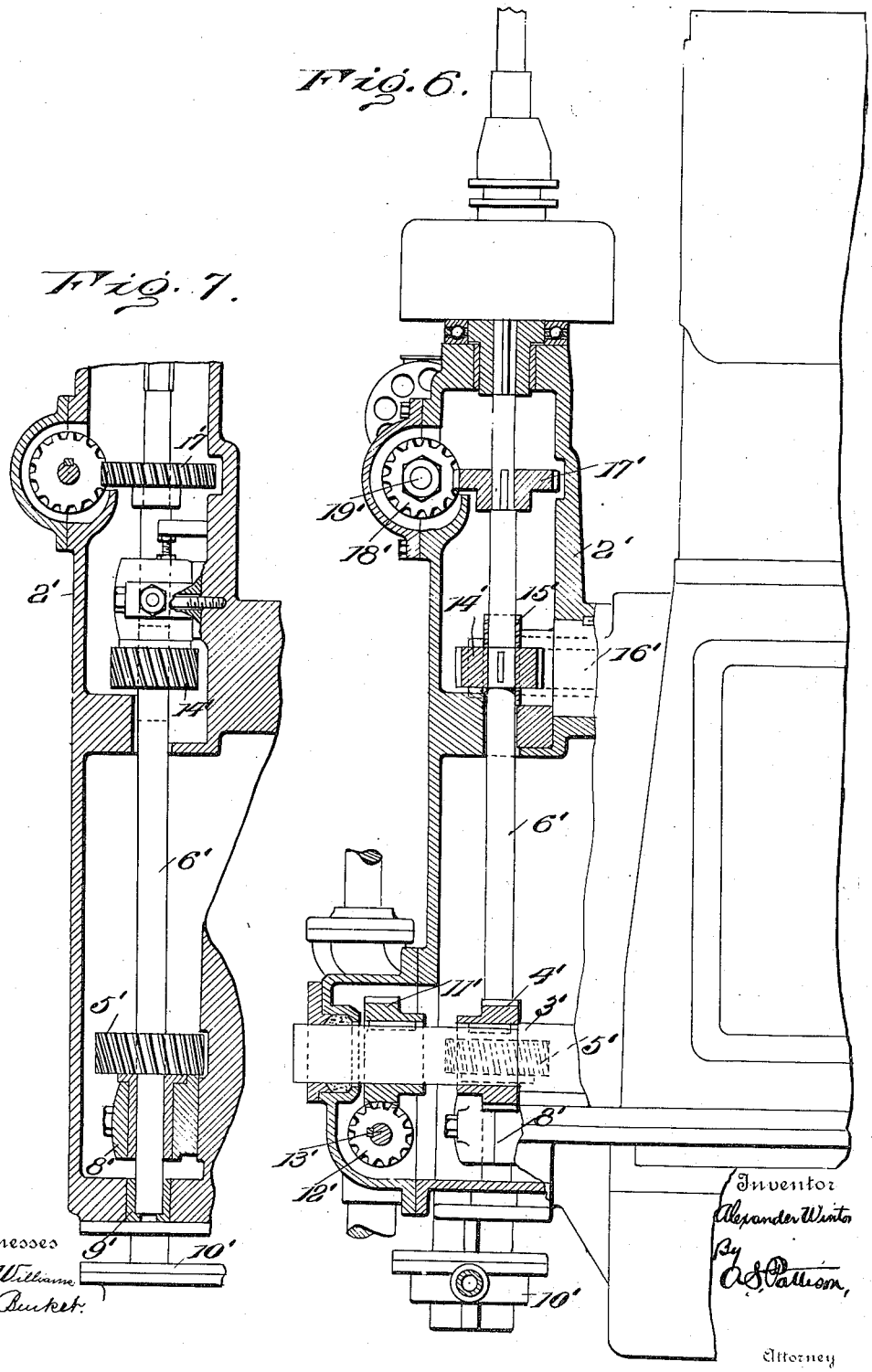

ALEXANDER WINTON, OF CLEVELAND, OHIO, ASSIGNOR TO WINTON GAS ENGINE AND MANUFACTURING COMPANY, OF CLEVELAND, OHIO.

GAS-ENGINE.

1,134,795.  Specification of Letters Patent.  Patented Apr. 6, 1915.

Application filed September 8, 1913. Serial No. 788,655.

*To all whom it may concern:*

Be it known that I, ALEXANDER WINTON, a citizen of the United States, residing at Cleveland, in the county of Cuyahoga and State of Ohio, have invented certain new and useful Improvements in Gas-Engines, of which the following is a specification, reference being had therein to the accompanying drawing.

My invention relates to improvements in gas engines.

The object of my invention is to provide a gas engine whereby the cam shaft, water pump, oil pump magneto and fan shaft are readily driven by a common shaft driven directly by the engine shaft, through the medium of worm gearing. At the same time providing means whereby the gearing may be more readily adjusted to maintain exact center distances and diameters whereby silence is obtained during the running of the gears.

Another object of my invention is to provide means whereby the wear between gears and bushings caused by the thrust may be readily taken up, thus maintaining the silence which is essential in engines of this character.

A still further object of my invention is to provide a simple, cheap and more effective structure to accomplish the result sought and having certain details of structure hereinafter more fully pointed out.

In the accompanying drawings, Figure 1 is an end view of an automobile engine embodying my invention. Fig. 2 is a side elevation of Fig. 1 showing the casing broken away and also showing the means for operating the magneto and adjusting means therefor. Fig. 3 is a side elevation of the magneto operating means looking in a direction at right angles to Fig. 2. Fig. 4 is a top plan view of the fan operating means. Fig. 5 is an end view of a stationary or marine engine embodying my invention. Fig. 6 is a vertical sectional view of Fig. 5 looking in the direction of the arrow. Fig. 7 is a vertical view of Fig. 5 looking in the opposite direction to that of Fig. 6.

Referring now to the drawings 1 represents a gas engine broken away after the first pair of cylinders, it being understood that 2, 4, 6 or any number of cylinders could be used. In gas engines a train of spur-gears are usually employed to operate the fan, water pump, oil pump, magneto, and the cam shaft and in such cases it has been extremely hard to obtain absolute silence, due to the necessity for maintaining exact center, distances and diameters. If these distances and diameters are not exact noise will surely ensue.

With my improved invention instead of the spur-gear I employ worm gears and provide means for the adjustment of said worm gears so that they can be accurately adjusted and thus avoiding any noise.

The end of the cylinder 1 as shown in Fig. 1 of the drawings is provided with a casing 2 and the crank shaft 3 extends out into said casing. This crank shaft within the casing is provided with a worm gear 4 which meshes with the worm gear 5 rigidly carried by the vertically disposed shaft 6. This shaft 6 as shown in Figs. 1 and 2 of the drawings extends from the lower end of the casing to a point approximately to the upper end thereof, and as shown is rotatably mounted in bearings 7 and 8. These bearings as shown are secured to the casing by means of screw-bolts 9 passing through elongated slots, whereby the bearings are vertically adjustable on the casing. Below the upper bearing 7 on each side of the shaft 6 are outwardly extending lugs 7 and rotatably mounted within said lugs are screw-bolts 11 having nuts 12 on their upper ends which bear against the lower face of the bearing 7. Carried by the said screw-bolts 11 are nuts 13 which have their lower faces engaging the upper faces of the lugs 10 and by turning the nuts 12 and 13 it will be seen that the bearing 7 is vertically adjustable.

The side of the casing 1 is provided with a lug 14 in a horizontal alinement with the bearing and in which is mounted a screw bolt 15 having a nut 16 on its inner end bearing against the side of the bearing 7. On the outer end of the screw bolt 15 is a nut 17 which bears against the inner face of the lug 14 and by turning the said nuts 16 and 17 it will be seen that the bearings 7 may be adjusted transverse the shaft 6, it being understood that the slots through which the bolts 9 pass being of a width greater than the diameter of the bolts in order to allow for this transverse movement.

The casing 2 above the bearings 8 is provided with outwardly extending lugs 19 in which are mounted the screw bolts 20 having upper nuts 21 bearing against the lower face of the lugs 19 and the lower nuts 22 bearing against the upper face of the bearing 8 whereby the bearing is vertically adjusted and the upward thrust thereon caused by the shaft 6 prevents the bearing from moving upwardly and yet allows for its vertical adjustment. This bearing 8 is secured to the casing by means of bolt 23 passing through slots of a diameter greater than that of the bolt to allow for the vertical movement of the bearing. The side of the casing opposite to that carrying the lug 14 is pivoted with a lug 24 in which is mounted the screw bolt 25 having a nut 26 bearing against the outer face of the lug and a nut 27 bearing against the outer face of the bearing 8. By this arrangement it will be seen that the bearing 8 can be adjusted transverse the shaft 6 the same as the bushings 7.

As heretofore stated the shaft 6 is provided with a worm 5 which meshes with the worm 4 carried by the crank shaft 3 whereby the said shaft 6 is continuously rotated. The shaft 6 above the bearing 8 is provided with a worm 28 which meshes with a worm 29 carried by the cam shaft 30 and whereby said cam shaft is continuously rotated.

The upper end of the shaft 6 above the bearing 7 is provided with a worm 3 which meshes with a worm 32 carried by the fan shaft 33. This fan shaft 33 is mounted in two bearings 34 one on each side of the worm 32. These bearings are adjusted horizontally by means of bolts 35 carrying nuts 36 the same as the bearing 7 whereby the worm 32 is horizontally adjusted to properly engage the worm 31.

The lower end of the shaft 6 is provided with a crank or eccentric 37 for operating the oil pump 38. Meshing with the worm 4 is a worm 39 carried by the water pump shaft 40. This shaft 40 is mounted in bearings 41 and 42 which are vertically adjusted by means of bolts 43 in the same manner as the bearing 8. The bearing 42 is horizontally adjusted longitudinally of the shaft by means of bolts 43 whereby the worm 39 is adjusted transverse of the shaft 3 carrying the worm 4 for causing the proper engagement of the worm 39 with the worm 4.

The structure heretofore described shows an automobile engine in which worm gears may be readily employed for driving the cam shaft, the fan shaft, water pump and the magneto whereby the worms may be readily adjusted to properly engage and drive the several parts with practically no noise. The cam shaft 30 at its outer end on the opposite ends of the cylinder is provided with a worm 45 which meshes with a worm 46 mounted upon the magneto shaft 47.

The magneto shaft 47 is mounted in a bearing 48 secured to a support 49 by means of bolts 50 and vertically adjusted by means of bolts 51 and horizontally adjusted by means of bolts 52 and in precisely the same manner as the bearing 41 and in the same respect to the worm carried thereby.

By the foregoing description I have produced an engine in which a cam shaft, the magneto, the fan shaft, the water pump and the oil pump are all operated by a common shaft driven directly by the crank shaft.

In the form shown in Figs. 5 to 7 inclusive I have shown my improved device as applied to a stationary or a marine engine. The crank shaft 3' of this engine carries a worm 4' meshing with a worm 5' carried by the vertically disposed shaft 6' mounted in the casing 2' carried by the end of the cylinder. The bearings 7' and 8' are adjusted in precisely the same manner as the bearings 7 and 8 of the automobile engine and therefore needs no further description. The lower end of the vertically disposed shaft 6' is rigidly secured to a bushing 9' carrying the shaft of the oil pump 10' and whereby the oil pump is driven directly by the shaft 6'. The crank shaft 3' beyond the worm gear 4' is provided with a worm gear 11' meshing with the worm 12' carried by the shaft 13' of the water pump. The shaft 6' above the worm 5' is provided with a worm 14' meshing with the worm 15' mounted on the cam 16'. Above the bearing 7' the shaft 6' has rigidly secured thereto a worm gear 17' meshing with the worm 18' carried by the shaft 19' of the magneto. The modification shown in Figs. 5 to 7 inclusive employs the same broad principle of having the water pump, oil pump, the cam shaft and the magneto all driven by worm gears by a vertically disposed shaft driven by worm gears directly from the crank shaft.

While I have shown and described this specific arrangement of parts it will be understood that this could be slightly varied without departing from my invention, as the arrangement of the several parts is different in different makes of engines.

From the foregoing description it will be seen that I have produced an engine in which the cam shaft, the pump shaft, the fan shaft and the magneto are readily driven and at the same time providing means whereby the gears are readily adjusted to properly mesh. I also provide means whereby the wear of the gears is readily taken up and at the same time providing means whereby the wear on the bearings is readily taken up so that the gears will properly mesh.

Having thus described my invention what I claim and desire to secure by Letters Patent is:—

1. The combination with the crank shaft of a gas engine, of a worm carried thereby, a shaft having a worm meshing with the worm of the crank-shaft and adapted to drive the operated parts of the engine, and means for vertically and horizontally adjusting said shaft whereby the worm of the shaft may be alined with the worm on the crank-shaft, substantially as shown and described.

2. The combination with a crank-shaft of a gas engine, of a worm gear carried by the crank shaft, a shaft adjacent the crank-shaft and having a worm meshing with the worm carried thereby, means carried by the shaft for operating the movable parts of the engine, and means for adjusting the shaft longitudinally and transversely, whereby the worm carried by the shaft may be alined with the worm carried by the crank-shaft.

3. The combination with a crank-shaft of a gas engine, of a worm carried by the said crank-shaft, a shaft adjacent the crank shaft, a worm carried by the shaft and meshing with the worm on the crank-shaft, worms carried by the shaft for driving the movable parts of the engine, bearings carried by the engine and in which the shaft is mounted and means for vertically and horizontally adjusting the said bearings whereby the worm carried by the shaft can be alined with the worm on the crank-shaft and the worm carried by the shafts for driving the movable parts of the engine, whereby the said worms can be alined for the purpose described.

4. The combination with a gas engine and its crank-shaft, a worm carried by the crank shaft, bearings vertically and horizontally adjustably supported by the end of the engine, a shaft carried by the said bearing, a worm carried by said shaft and meshing with the worm carried by the crank shaft, a fan-shaft, a cam-shaft, and a water pump-shaft having worms, worms carried by the vertically and horizontally adjustable shaft meshing with the worms carried by the cam-shaft and water pump-shaft, whereby said worms may be alined for the purpose described.

5. The combination with a gas engine and its crank shaft, of a worm carried by the crank shaft, vertically and horizontally adjustable bearings carried by the ends of the engine, a shaft rotatably supported in said bearings, a worm carried by said shaft and meshing with the worm carried by the crank shaft, a worm carried by the cam-shaft, a worm carried by the vertically and horizontally adjustable shaft and meshing with the worm carried by the cam-shaft, and means for vertically and horizontally adjusting the cam-shaft, whereby the worms may be alined for the purpose described.

6. The combination with a gas engine and its crank shaft of a worm carried by the crank shaft bearings vertically and horizontally adjustably supported by the engine, a vertically disposed shaft mounted in said bearings, a worm carried by said shaft and meshing with the worm carried by the crank shaft, means carried by the lower end of the vertically disposed shaft for operating the oil pump, a cam shaft, a worm on the said cam shaft, a worm carried by the vertically disposed shaft and meshing with a worm carried by the cam shaft, a worm carried by the upper end of the vertically disposed shaft and meshing with a worm carried by the magneto shaft, means for horizontally and vertically adjusting the magneto shaft, a worm carried by the water pump and meshing with the worm carried by the crank shaft and means for vertically and horizontally adjusting the water pump shaft.

7. The combination with a gas engine and its crank shaft of a vertically disposed shaft adjacent the crank shaft, a worm carried by the vertically disposed shaft and meshing with the worm carried by the crank shaft, means for vertically and horizontally adjusting the vertically disposed shaft, means carried by the lower end of the shaft for operating the oil pump, a cam shaft, a worm on said cam shaft, a worm carried by the vertically disposed shaft and meshing with the cam shaft, a worm carried by the opposite end of the cam shaft and meshing with a worm carried by the magneto shaft, a magneto shaft, means for vertically and horizontally adjusting the magneto shaft, a worm carried by the upper end of the vertically disposed shaft and meshing with the worm carried by the fan shaft, a fan shaft, means for vertically and horizontally adjusting the fan shaft, a water pump shaft adjacent the crank shaft and having a worm meshing with the worm of the crank shaft and means for vertically and horizontally adjusting the fan shaft.

8. The combination with a gas engine and its crank shaft of a vertically disposed shaft adjacent the crank shaft, means for horizontally and vertically adjusting the said shaft, a cam shaft, a fan shaft, a gear connection between said shaft and the crank shaft and a gearing operated by the vertically disposed shaft for operating the cam shaft and the fan shaft.

9. The combination with a gas engine and its crank shaft, bearings carried by the engine and having screw-rod connections with the engine for vertically and horizontally adjusting the same, a shaft rotatably mounted in said bearings, a gear carried by the said shaft and meshing with the gear carried by the crank shaft and a gearing driven by the vertically disposed shaft for driving the cam shaft and the fan shaft.

10. The combination with a gas engine and its crank-shaft, a worm carried by the crank-shaft, of a vertically disposed shaft adjacent the crank-shaft, a worm carried by the vertically disposed shaft meshing with the worm carried by the crank-shaft, means for vertically and horizontally adjusting the vertically disposed shaft, an oil pump shaft, means carried by the lower end of the shaft for operating the oil-pump, a horizontally arranged cam-shaft, a worm carried thereby, a worm carried by the vertically disposed shaft meshing with the worm carried by the cam shaft, a magneto shaft, a worm carried by the opposite end of the cam-shaft meshing with a worm carried by the magneto-shaft, means for adjustably and horizontally adjusting the magneto-shaft, a worm carried by the upper end of the vertically disposed-shaft, a horizontally arranged fan-shaft, a worm carried by the fan-shaft meshing with the worm carried by the upper end of the vertically disposed shaft, means for vertically and horizontally adjusting the vertical shaft, a water-pump shaft adjacent the crank-shaft, a worm carried by said pump-shaft and meshing with the worm of the crank shaft, and means for vertically and horizontally adjusting the water pump-shaft whereby the several worms can be alined and adjusted to prevent noise.

In testimony whereof I hereunto affix my signature in the presence of two witnesses.

ALEXANDER WINTON.

Witnesses:
HAROLD B. ANDERSON,
W. A. WALKEMEYER.